United States Patent
Simmler et al.

(10) Patent No.: US 12,540,989 B2
(45) Date of Patent: Feb. 3, 2026

(54) USE OF FUNCTION-SPECIFIC GASES IN AN MAS MICRO-GAS TURBINE FOR SOLID STATE NMR

(71) Applicant: Bruker BioSpin GmbH & Co. KG, Ettlingen (DE)

(72) Inventors: Rico Simmler, Karlsruhe (DE); David Osen, Ettlingen (DE); Daniel Podadera Sanchez, Wissembourg (FR); Lukas Becker, Waldbronn (DE)

( * ) Notice: Subject to any disclaimer, the term of this patent is extended or adjusted under 35 U.S.C. 154(b) by 202 days.

(21) Appl. No.: 18/619,464

(22) Filed: Mar. 28, 2024

(65) Prior Publication Data
US 2024/0329169 A1    Oct. 3, 2024

(30) Foreign Application Priority Data
Mar. 29, 2023    (DE) ............... 10 2023 202 880.8

(51) Int. Cl.
*G01R 33/30* (2006.01)
*G01R 33/31* (2006.01)
*G01N 24/08* (2006.01)

(52) U.S. Cl.
CPC ........... *G01R 33/307* (2013.01); *G01R 33/31* (2013.01); *G01N 24/08* (2013.01)

(58) Field of Classification Search
CPC ....... G01R 33/307; G01R 33/31; G01N 24/08
See application file for complete search history.

(56) References Cited

U.S. PATENT DOCUMENTS

| | | | |
|---|---|---|---|
| 4,275,350 A | 6/1981 | Hill et al. | |
| 4,940,942 A * | 7/1990 | Bartuska | G01R 33/31 324/307 |

(Continued)

FOREIGN PATENT DOCUMENTS

| | | |
|---|---|---|
| CN | 114673569 | 6/2022 |
| EP | 3301467 | 11/2021 |

(Continued)

OTHER PUBLICATIONS

Sesti Erika L et al: "Magic angle spinning NMR below 6?K with a computational fluid dynamics analysis of fluid flow and temperature gradients", Journal of Magnetic Resonance, Academic Press, Orlando, FL, US, Bd. 286, Nov. 11, 2017.

(Continued)

*Primary Examiner* — G. M. A Hyder
(74) *Attorney, Agent, or Firm* — DECODE Legal Inc.

(57) ABSTRACT

An NMR method and apparatus uses a magic angle spinning (MAS) system with a MAS turbine having a MAS stator and a MAS rotor. At least two different gases or gas mixtures are fed to the stator through separate gas feeds, a first for the driving of the rotor and another, which is different from the first, for the bearing of the rotor. Respective pressures of the at least two different gases or gas mixtures are regulated separately, and the different gases or gas mixtures are prevented from mixing in the stator by means of a flushing seal through which they at least partially flow out of the stator. Conventional outflow nozzles do not need to be adapted, and the rotor can be operated at a high rotational frequency even at low pressures. The pressures remain stable so that no rotational oscillations occur during the NMR measurement.

13 Claims, 4 Drawing Sheets

(56) References Cited

U.S. PATENT DOCUMENTS

| | | | |
|---|---|---|---|
| 5,508,615 | A | 4/1996 | Doty et al. |
| 9,995,802 | B2 | 6/2018 | Bouleau et al. |
| 10,459,044 | B2 | 10/2019 | Osen et al. |
| 2009/0021260 | A1 | 1/2009 | Stringer |
| 2010/0026302 | A1 | 2/2010 | Doty et al. |

FOREIGN PATENT DOCUMENTS

| | | |
|---|---|---|
| JP | S55-163447 | 12/1980 |
| JP | 2017-116322 | 6/2017 |
| WO | 2021097382 | 5/2021 |

OTHER PUBLICATIONS

Wendell H. Potter, Apparatus to Rotate Samples Rapidly at Temperatures Less than 2K in High Transverse Magnetic Fields, Review of Scientific Instruments 42, 618 (1971).

Y. J. Jiang et al., Efficient stator/rotor assembly for magic-angle spinning NMR, Review of Scientific Instruments 58, 755-759 (1987).

Kent R. Thurber et al., Biomolecular solid state NMR with magic-angle spinning at 25K, Journal of Magnetic Resonance 195 179-186 (2008).

Kent R. Thurber et al., Solid state nuclear magnetic resonance with magic-angle spinning and dynamic nuclear polarization below 25 K, J. Magn Reson., 226C, 100-106 (2013).

E. Bouleau et al., Pushing NMR sensitivity limits using dynamic nuclear polarization with closed-loop cryogenic helium sample spinning, Chem. Sci., 6, 6806 (2015).

\* cited by examiner

USE OF FUNCTION-SPECIFIC GASES IN AN MAS MICRO-GAS TURBINE FOR SOLID STATE NMR

BACKGROUND OF THE INVENTION

Field of the Invention

The invention relates to an NMR apparatus, which has a magic angle spinning (MAS) system having an MAS turbine comprising an MAS stator for receiving an oblong MAS rotor, wherein separate gas feeds for the bearing and for the drive of the MAS rotor are arranged in the MAS stator.

Description of the Related Art

An NMR apparatus having such an MAS system and a corresponding operating method are known per se, for example from Jiang, Y. J., et al. Efficient stator/rotor assembly for magic-angle spinning NMR, Review of scientific instruments, 1987, 58, 755-758.

Similar apparatuses are also known from U.S. Pat. No. 5,508,615 A or also from the article by K. R. Thurber et al., "Biomolecular solid state NMR with magic-angle spinning at 25 K," *Journal of Magnetic Resonance*, 195 (2008) 179-186.

The present invention relates in general to the area of magnetic resonance. Nuclear magnetic resonance (NMR) spectroscopy is a commercially widespread method of instrumental analysis for characterizing the chemical composition of substances. High-frequency pulses are radiated for this purpose into a measurement sample, which is located in a strong static magnetic field, due to which the alignment of nuclear spins in the measurement substance occurs, and the electromagnetic reaction of the measurement sample is measured. The information is then integrally obtained over a certain area of the measurement sample, the so-called active volume, and evaluated to determine the chemical composition.

In solid state NMR spectroscopy, to reduce line expansions due to anisotropic interactions, having an NMR sample rotate at high frequency (typically several kilohertz) during the spectroscopic measurement tilted at the so-called "magic angle" ($arctan\sqrt{2} \approx$) 54.74° in relation to the static magnetic field is furthermore known. For this purpose, the sample is poured into an MAS rotor. MAS rotors are generally cylindrical tubes open on one side, which are closed with a cap, wherein the cap is provided with wing elements, in particular small bladed wheels. The MAS rotor is arranged in an MAS stator, and the MAS rotor is driven via the wing elements for rotation using gas pressure. The MAS rotor and MAS stator are collectively called an MAS turbine.

During the rotation of the NMR sample in a surrounding gas, the wall of the MAS rotor heats up due to the gas friction. This results in inhomogeneous temperature distribution over the sample substance and undesired heating of the sample substance. The MAS rotor with the NMR sample is therefore typically kept at a desired temperature during the measurement by means of the supply of a temperature control gas, as described, for example, in EP 3 301 467 B1, where an MAS system having similar features to those defined at the outset is also used.

Higher rotation speeds in the MAS system for the solid-state NMR can be achieved by the use of alternative gases (such as helium instead of nitrogen) for the bearing and drive of the MAS rotor. However, high additional costs arise for the user due to the use of helium in the bearing. Furthermore, the spray resistance is reduced in helium. Moreover, a redesign of the bearing and drive nozzles is then required. In conventional MAS stators, the nozzle openings and the bearing gap widths are typically designed for the density and viscosity of nitrogen, since this gas is used in laboratories worldwide due to its inert gas properties, its good availability, and the low price.

Thus, for example, in US 2010/0026302 A1 a CryoMAS system for high-field magnets is described, in which the MAS rotor can also be operated at very low temperatures down to 20 K or at higher rotation speeds. For these cases, the use of helium instead of nitrogen as the bearing and drive gas is recommended.

In the scientific article by E. Bouleau et al., "Pushing NMR sensitivity limits using dynamic nuclear polarization with closed-loop cryogenic helium sample spinning," *Chemical science* 6.12 (2015): 6806-6812, the use of helium both as a cooling gas and as a drive gas for a DNP-MAS turbine is described. Likewise for use at very low temperatures, Bouleau describes, in U.S. Pat. No. 9,995,802 B2, an MAS rotor, which can be operated either using nitrogen or using helium as the cooling and drive gas.

WO 2021/097382 A1 describes the use of diamond as a material for an MAS rotor to increase the possible rotation speed. In this context, the use of helium as a drive gas is also described.

In the aforementioned article to Thurber et al., the use of nitrogen as a drive and bearing gas for MAS rotation and of cold helium for VT (thus only for the temperature control of the NMR sample) is described. A scientific article by W. H. Potter, "Apparatus to Rotate Samples Rapidly at Temperatures Less than 2 K in High Transverse Magnetic Fields" in Review of Scientific Instruments 42, 618 (1971), also discloses similar subject matter. Helium is again mentioned here as a cooling and drive gas.

U.S. Pat. No. 5,508,615 A describes a "Supersonic Sample Spinner", thus an MAS rotor, which is to rotate in the supersonic range. This can be operated (thus mounted and driven) either solely using helium or using a helium/nitrogen mixture to reduce the bearing heating due to the rapid rotation of the MAS rotor. Up to 5% helium in nitrogen is accordingly to be possible without thus inducing significant problems of a voltage flashover between MAS rotor and MAS stator in operation.

The aforementioned article to Jiang, Y. J., et al. merely mentions operation of a MAS system with a single gas or mixture of gases, never with a plurality of different gases or gas mixtures.

One general tendency in MAS technology is directed toward operating the MAS rotors at greater and greater rotational frequencies. The speed of sound of the drive gas is always mentioned as a limiting factor for this in the literature. The effectiveness of nitrogen as a drive gas already decreases before reaching the speed of sound. Other gases (such as helium) have advantageous properties due to their higher speed of sound and/or different viscosity for use in MAS systems for solid-state NMR using MAS rotors which are supposed to rotate particularly rapidly.

It then appears opportune if possible in the case of an intended higher rotational frequency of the MAS rotor to exchange the drive gas used up to this point for another gas having a higher speed of sound, thus, for example, nitrogen for helium. This is known per se in principle, but unfortunately simply exchanging the operating gases with the goal of a higher speed of sound does not readily function in practice, since without a gas having high density and thus lower speed of sound, such as nitrogen, good gas bearing of the MAS rotor is not obtained.

SUMMARY OF THE INVENTION

The present invention is based on the object of maximizing the rotational speed of the MAS rotors using the conventional MAS stators, as are typical for an NMR apparatus having the features defined at the outset. The necessity of a special design of the MAS stators for light gases is to be avoided here according to the invention. In these known MAS stators, the physical gas feeds for the drive and bearing gas flows are already spatially separated. However, the previously typical outflow nozzles do not necessarily have to be adapted because of the present invention. The possibility of an efficiency increase such that the MAS rotor can already be operated at the lowest possible applied pressures using a high rotational frequency is also important. The pressures are to be stable in this case, so that the least possible rotational oscillations occur during the NMR measurement.

This complex object is achieved by the present invention in a likewise surprisingly simple and effective manner by a method for operating an NMR apparatus of the type defined at the outset in that at least two different gases or gas mixtures are fed to the MAS stator through the separate gas feeds, wherein one of the at least two different gases or gas mixtures is fed to the MAS stator for the drive of the MAS rotor through a first gas feed, another gas or gas mixture, which is different therefrom, is fed for the bearing of the MAS rotor through a second gas feed, that a pressure application of the at least two different gases or gas mixtures is regulated separately in each case before they are fed into the MAS stator, and that the different gases or gas mixtures are prevented from mixing in the MAS stator by means of a flushing seal arranged in the MAS stator, through which the different gases or gas mixtures for the drive of the MAS rotor and for the bearing of the MAS rotor at least partially flow out of the MAS stator.

The basic concept of the present invention is to use a particular suitable gas or gas mixture for each function in the MAS system. The present invention thus proposes implementing a consistent separation of the gas guidance and gas preparation.

In particular due to the invention, previously unsuspected possibilities open up for a function-specific optimization of the gases used for the bearing of the MAS rotor and its drive in an MAS micro-gas turbine for solid-state NMR.

The spatially separate gas feeds, which are normally already present in a classic MAS system, for charging the MAS rotor with bearing and drive gas can now immediately be used by the invention, even without physical reconfiguration, with a different gas composition for bearing and drive.

The gases or gas mixtures to be used can readily be selected so that electrical flashovers at the HF coil of the NMR apparatus can also still be precluded.

Furthermore, a regulating unit is provided, which regulates the different gas flows in particular with respect to the applied pressure and makes the composition thereof adjustable.

Helium is not permitted to reach the bearing so as not to reduce the bearing rigidity. Vice versa, the speed of sound is reduced by $N_2$. The bearing gas therefore is not permitted to reach the drive region. Efficient separation is thus necessary because bearing and drive are to be decoupled according to the invention.

Optionally, a temperature control gas flow (VT) for the temperature control of the MAS rotor and thus the NMR sample is also (still) possible. Its charging can again take place using a gas or gas mixture separately optimized for this purpose, in particular certainly also using the bearing gas used or the drive gas.

The VT gas is emitted in the stator directly at the rotor or is directed onto the rotor, where the coil is also seated. The dielectric strength can therefore also be increased by the corresponding selection of a separate temperature control gas. The gas properties can be optimized by reasonable selection of the VT gases, in particular if one goes into the extreme ranges, thus very high or very low temperatures. In this case, the bearing gas is also used as a heat shield from excessively high/low temperatures. The temperature control gas can possibly be stopped, for example, during room temperature measurements to reduce the total flow in the MAS turbine.

In one particular embodiment of the method according to the invention, the different gases or gas mixtures fed via the separate gas feeds into the MAS stator and the MAS rotor are prepared from raw gases or raw gas mixtures introduced into a separate gas regulating unit, before they are conducted via the separate gas feeds into the MAS stator and the MAS rotor. The optimum control of the gas parameters is important in the gas regulating unit. The pressure, temperature, and rotational frequency sensors on the stator emit the information to the regulating unit, which is used so that the gas mixtures are prepared in accordance with their optimum composition and pressure or temperature and conducted via separate gas feeds into the MAS stator and to the MAS rotor. This also used for the purpose of the automation with the aid of an operating unit (software), into which the user inputs specified parameters, such as frequency, temperature, etc. Costs can also be saved by reasonable mixture preparation, for example, if expensive helium is reduced at low rotational frequencies.

In practice, variants of the method according to the invention have proven themselves which are distinguished in that the pressure of the gas or gas mixture Y for the bearing of the MAS rotor is regulated to a value between 0.5 and 5 bar and the pressure of the gas or gas mixture X for the drive of the MAS rotor is regulated to a value between 0 and 10 bar.

An accurate regulation of the pressure and the flow is necessary in order to obtain stable speeds. A deviation of only 1 mbar already results in a speed change of 50 Hz. For precise stable measurements, however, the deviation should be at most 10 Hz. The drive is regulated to the sub-millibar range, which would only be possible with difficulty by manual regulation. Since one also wishes to measure over larger ranges, the pressure regulation over a large range is also necessary.

In further variants, $N_2$ is present in the gas mixture Y for the bearing of the MAS rotor and helium is present in the gas mixture X for the drive of the MAS rotor, and in particular dry nitrogen is used as the gas Y for the bearing of the MAS rotor. $N_2$ is inert, has a high density, and is available well and inexpensively. It is thus well matched for use as a bearing gas. Helium has a high speed of sound; this gas can thus flow faster and can rotate the MAS rotor faster.

Method variants are also advantageous in which a $N_2$—He mixture having an He proportion between 0 and 50%, in particular between 0 and 30% is used as the gas mixture Y for the bearing of the MAS rotor. The speed of sound can be adapted/increased by the mixture in the bearing gas. This is because at high rotational speeds, there are problems from shockwaves and turbulence upon reaching the supersonic speed, which are thus avoided.

Further variants of the method according to the invention are characterized in that between 10% and 100%, in particular between 25% and 100%, preferably between 50% and 100% helium is used as the gas or gas mixture X for the drive of the MAS rotor. Helium has a higher speed of sound. At lower drive speeds, $N_2$ can also be fed in addition, because it has a better drive efficiency and availability.

These method variants can be improved still further in that the helium used has a degree of purity of at least 95%. 5% impurity has little influence on the speed of sound. Industrial helium, which is very slightly impure and therefore more cost-effective, can therefore also be used.

In variants of the method according to the invention, a further gas or gas mixture Z is conducted as a temperature control gas for a temperature control of the MAS rotor by an additional gas feed, which is spatially separate from the gas feed for the bearing of the MAS rotor and from the gas feed for the drive of the MAS rotor, into the MAS stator and is also separately regulated. The sample is to be controlled in temperature in a targeted manner, not the entire MAS system. The dielectric strength during the HF pulse can be increased by the deliberate selection of an appropriate gas.

To keep the operating costs low, in refinements of these method variants, dry nitrogen, C5-perfluorinated ketone (C5-PFK), or dried and purified air can be used as the gas or gas mixture Z for the temperature control of the MAS rotor. The VT gas is not permitted to liquefy or freeze in the temperature range. The dewpoint of the VT gas is to be below the target temperature in order to ensure the required dielectric strength.

An NMR apparatus also falls in the scope of the present invention which is designed for carrying out the method according to one of the above described variants and which has an MAS system having an MAS turbine comprising an MAS stator for receiving an oblong MAS rotor, wherein separate gas feeds for the bearing and for the drive of the MAS rotor are arranged in the MAS stator, wherein a gas regulating unit is present, which can be supplied with fed raw gases or raw gas mixtures via separate gas feed lines, and wherein the gas regulating unit is designed to prepare the raw gas or raw gas mixture for the gas drive of the MAS rotor and for the gas bearing of the MAS rotor and to apply the corresponding respective adapted pressure thereto and to conduct it via separate gas feeds into the MAS stator in order to effectuate the drive and the bearing of the MAS rotor in the MAS turbine separately from one another.

Such an NMR apparatus is distinguished according to the invention in that a gas regulating unit is present, which can be supplied with at least two different fed raw gases or raw gas mixtures X'; Y' via separate gas feed lines, and that the gas regulating unit is designed to prepare the raw gases or raw gas mixtures X'; Y' as gaseous media X; Y with different compositions for the gas drive of the MAS rotor and for the gas bearing of the MAS rotor and to apply the corresponding respective adapted pressure thereto and to conduct them via separate gas feeds into the MAS stator, in order to effectuate the drive and the bearing of the MAS rotor in the MAS turbine separately from one another. The MAS turbine comprises a flushing seal, which is arranged between drive nozzles and bearing nozzles as an outflow device for the drive and bearing gases X; Y and is designed so that at least a part of the bearing gas Y is conducted through to prevent the drive gas X from reaching the region of an NMR coil.

The gas regulating unit is used for the optimized and automated regulation of the gas flows, as already described above. The user only has to input the target data into software and the regulating unit then regulates the composition of the gases and the respective pressure setting which is required to achieve the targets. The regulating unit processes the corresponding sensor information from the MAS stator and adapts the flows. Furthermore, safety aspects can be integrated, both for the measurement in order to avoid rotor fracture, and also for the users themselves in the event of oxygen deficiency at the workplace, if an emergency shutdown is present.

In advantageous embodiments of the NMR apparatus according to the invention, the gas regulating unit is connected to a frequency sensor on the MAS turbine for setting the pressure and/or the composition of the drive and bearing gases X; Y.

A class of embodiments of the NMR apparatus according to the invention is also preferred, which are distinguished in that the MAS stator has a spatially separate additional gas feed for the feed of a further gas or gas mixture Z as a temperature control gas for a temperature control of the MAS rotor.

In advantageous refinements of this class of embodiments, the gas regulating unit contains a separate sub-regulating unit in each case for the separate regulation of the drive, bearing, and temperature control gases X; Y; Z. The gases have to be able to be individually regulated for the following reasons: the drive efficiency and high speed of sound (drive gas X); the bearing carrying capacity/bearing rigidity (bearing gas Y); and the temperature control (temperature control gas Z), because the flow of the VT gas and the thermal mass are decisive for the temperature control. The pressure regulation is used in particular for a constant speed.

Embodiments of the invention are also presented in which the gas regulating unit is connected to a temperature sensor on the MAS turbine for setting the temperature of the temperature control gas. A temperature sensor is necessary to keep the sample temperature constant. The data from the temperature sensor permit a conclusion about the temperature setting of the VT gas.

Further advantages of the invention result from the description and the drawings. The embodiments shown and described are not to be understood as an exhaustive list, but rather have exemplary character for the explanation of the invention.

DETAILED DESCRIPTION

Figure 1:
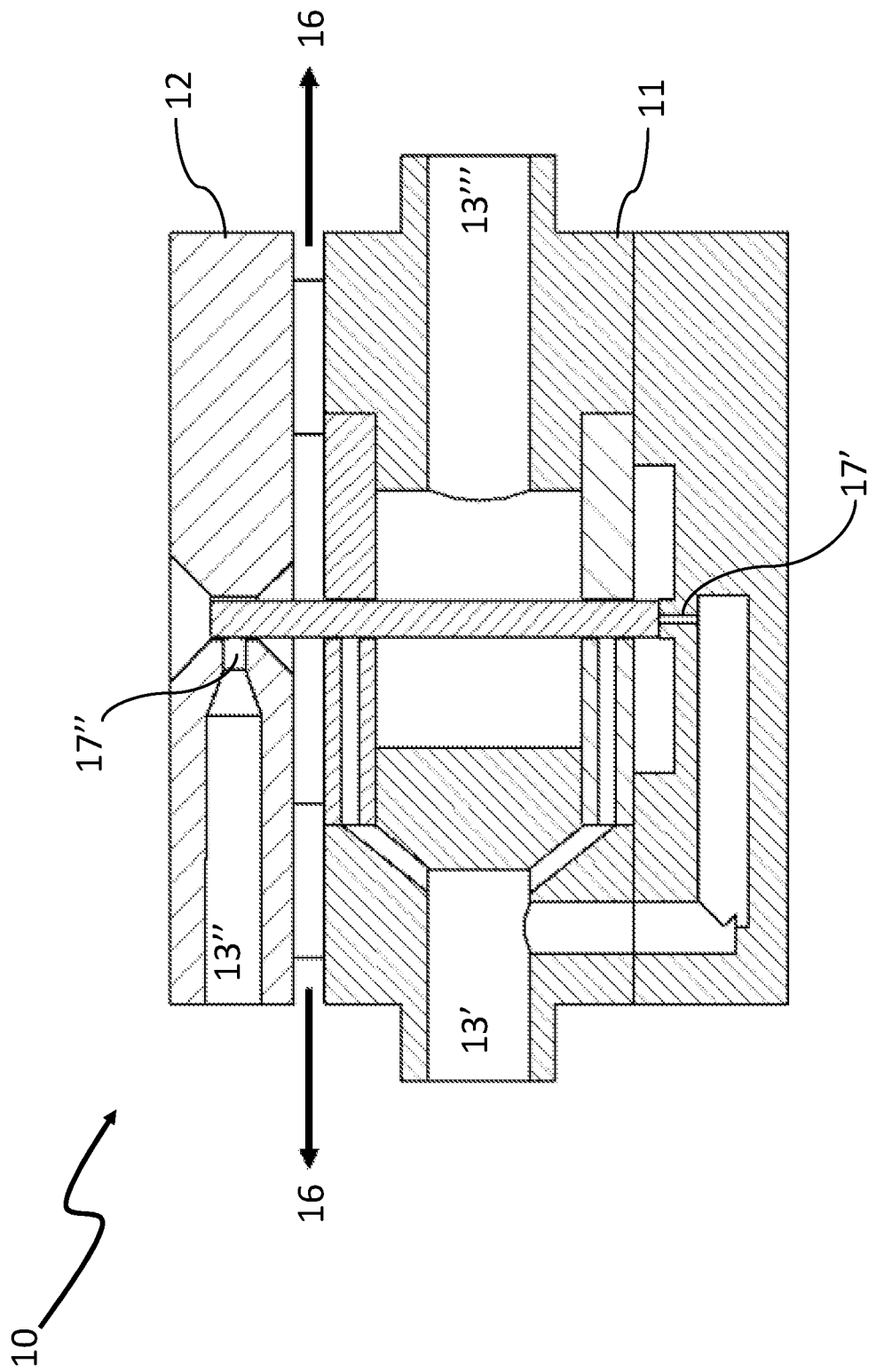
FIG. 1 shows a rough schematic representation of an embodiment of the MAS turbine according to the invention in vertical section.

The present invention relates to a method for operating an NMR apparatus, which has an MAS system having an MAS turbine 10 comprising an MAS stator 11 for receiving an oblong MAS rotor 12, wherein separate gas feeds 13'; 13" for the bearing and for the drive of the MAS rotor 12 are arranged in the MAS stator 11. The subject matter of the invention is also a correspondingly modified NMR apparatus.

The present invention is distinguished in relation to conventional operating methods according to the prior art in that at least two different gases or gas mixtures X; Y are fed to the MAS stator 11 through the separate gas feeds 13'; 13", wherein one of the at least two different gases or gas mixtures X is fed to the MAS stator 11 for the drive of the MAS rotor 12 through a first gas feed 13', another gas or gas mixture Y, different therefrom, for the bearing of the MAS rotor 12 is fed through a second gas feed 13", and a pressurization of the at least two different gases or gas mixtures X; Y is regulated separately in each case before they are fed into the MAS stator 11.

The physical feeds for bearing gas and drive gas are arranged spatially separate in most of the previously known MAS systems, however, up to this point only the same gas or gas mixture for bearing and drive has always been fed to the MAS system through these separate gas feeds.

However, pure helium is unsuitable in $N_2$-optimized bearings as a bearing gas. A functioning gas cushion does not result between the MAS rotor 12 and the MAS stator 11 due to the lower viscosity.

The cost increase for the user is limited by the exchange of the drive gas, which makes up 20% of the gas required for operation in fast systems. It is proposed according to the invention that helium be used as the drive gas in order to thus enable higher speeds. In addition to helium, other inert gases can also be admixed in small amounts. $N_2$ is typically used as the drive gas in MAS turbines. The efficiency upon the use of nitrogen is certainly low, because the resulting rotational frequency at a given pressure is lower than with helium, for example. The resulting maximum achievable frequency is also lower due to the lower speed of sound. An advantageous effect already results at 10% helium. The proportion of helium in the drive gas is preferably greater than 25% in order to significantly increase the efficiency. A proportion in the range of 50%-100% is particularly preferred.

The NMR coil is furthermore located in a nitrogen-based atmosphere due to the bearing gas feed, by which electrical flashovers can be avoided. However, in addition to nitrogen, the bearing gas can contain up to 33% helium without electrical flashovers taking place. The dielectric strength is dependent in particular on the field strength of the irradiated HF field. In NMR spectroscopy, the greatest possible power is radiated into the sample in order to maximize the magnetic B1 field. It is therefore important to adapt the composition of the bearing gas such that the dielectric strength is provided at the high field strength.

The physical parts of the bearing do not have to be adapted to the new gas dynamics if the invention is used, as a result of which many expenditures in development are omitted, i.e., nozzle openings and bearing gap widths between MAS rotor and MAS stator are not adapted.

To prevent the drive gas from reaching the area of the NMR coil generating the HF field, which is arranged essentially in the centre of the MAS rotor 12, a flushing seal 16 is used between upper bearing and the drive. FIG. 1 shows such an MAS turbine 10 modified according to the invention having flushing seal 16, indicated by two opposing arrows.

The flushing seal 16 is designed as a gas outlet, which is preferably arranged in a ring shape between the bearing nozzles 17' and the drive gas nozzles 17", as can be seen in FIG. 1. Due to the use of this flushing seal 16, it is possible for two different gases or gas mixtures to be used for the drive and the bearing without these mixing in the measurement region. In particular, the use of helium as a drive gas would reduce the dielectric strength of the coil in the measurement region, which is avoided by the flushing seal 16. The MAS system can therefore be operated at high field strengths with high rotational frequencies at the same time.

Ideally, the flushing seal 16 is designed so that at least a part of the bearing gas is conducted through to prevent the He-based drive gas from reaching the region of the NMR coil. The higher pressure of the bearing gas in relation to the drive gas is typically sufficient. Furthermore, a conical opening below the drive, thus where the rotor cap is seated, ensures that the pressure of the outflowing drive gas is reduced. This conical widening can also be seen in FIG. 1.

Figure 2:
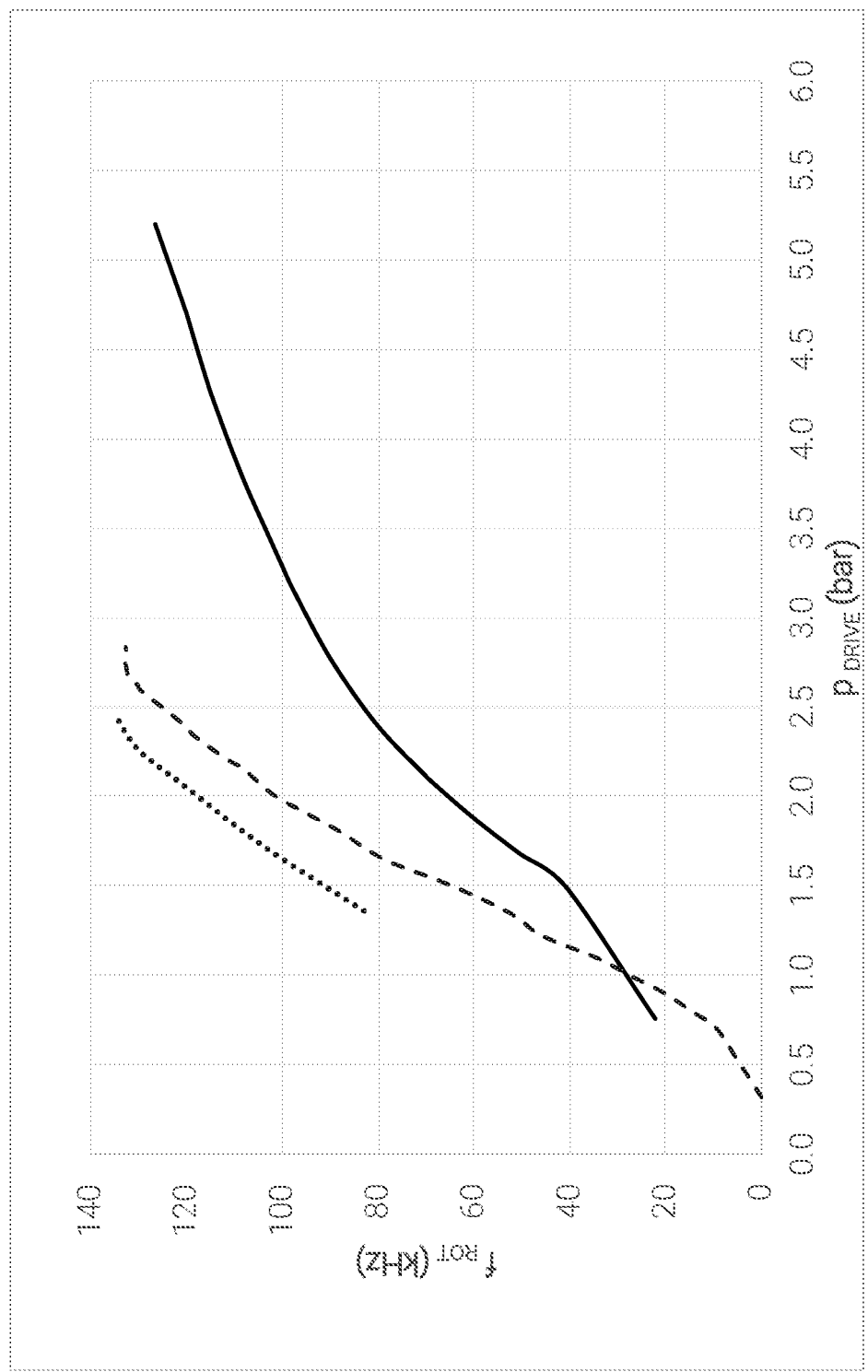
FIG. 2 shows graphs of the rotational frequency $f_{ROT}$ (kHz) in each case as a function of the drive pressure $p_{DRIVE}$ (bar) using three different bearing and drive gases or gas mixtures.

FIG. 2 shows three graphs of the rotational frequency $f_{ROT}$ (kHz) in each case as a function of the drive pressure $p_{DRIVE}$ (bar) using different bearing and drive gases or gas mixtures, namely:

solid curve: $N_2$ operation, prior art
dashed curve: drive using helium, bearing using $N_2$
dotted curve: drive using helium, bearing using 33% helium and 67% $N_2$.

A conventional MAS stator was used here for a cylindrical MAS rotor with 0.7 mm diameter. It is noticeable that the measured rotational frequency $f_{ROT}$ reaches higher values with the drive using helium. Surprisingly, the higher frequencies are reached at significantly lower drive pressure $p_{DRIVE}$ of the drive gas. This efficiency increase is additionally improved if a part of the $N_2$ bearing gas is replaced by ⅓ helium (dotted uppermost curve).

The operation of the system at lower pressures has the advantage that the mechanical load is lower; high pressures mean that higher energy is present in the pneumatic system, which can result in destruction. A termination of the curves at high pressures takes place because the cap deforms and grinds.

The different functions (drive, bearing; temperature control) of the MAS turbine 10 are implemented according to the invention using different gases. Respective optimum gases can thus be used for each function (drive, bearing; temperature control). In addition to the mentioned gases $N_2$ and helium, $CO_2$ and $SF_6$ are also conceivable. The latter are distinguished by a high dielectric strength and high density, because of which they can be used well as the bearing gas but also well as VT gases for the temperature control. $H_2$ has similarly advantageous properties to helium and could theoretically be used as a drive gas. However, a separation is necessary due to the combustibility of $H_2$.

Figure 3A:
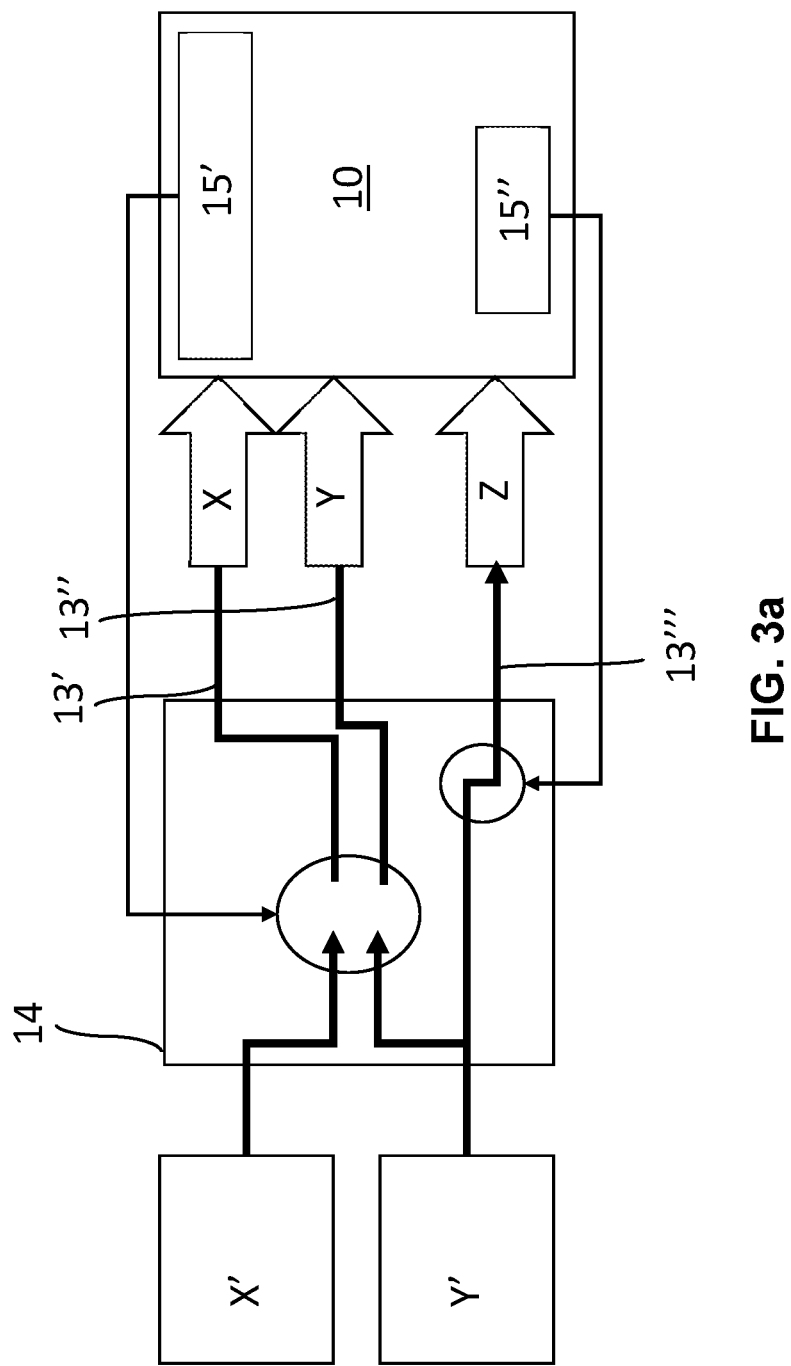
FIG. 3a shows a schematic function diagram for the gas management according to the invention of an MAS system with gas feed and regulating system for an MAS turbine in an embodiment for preparing two gases.
Figure 3B:
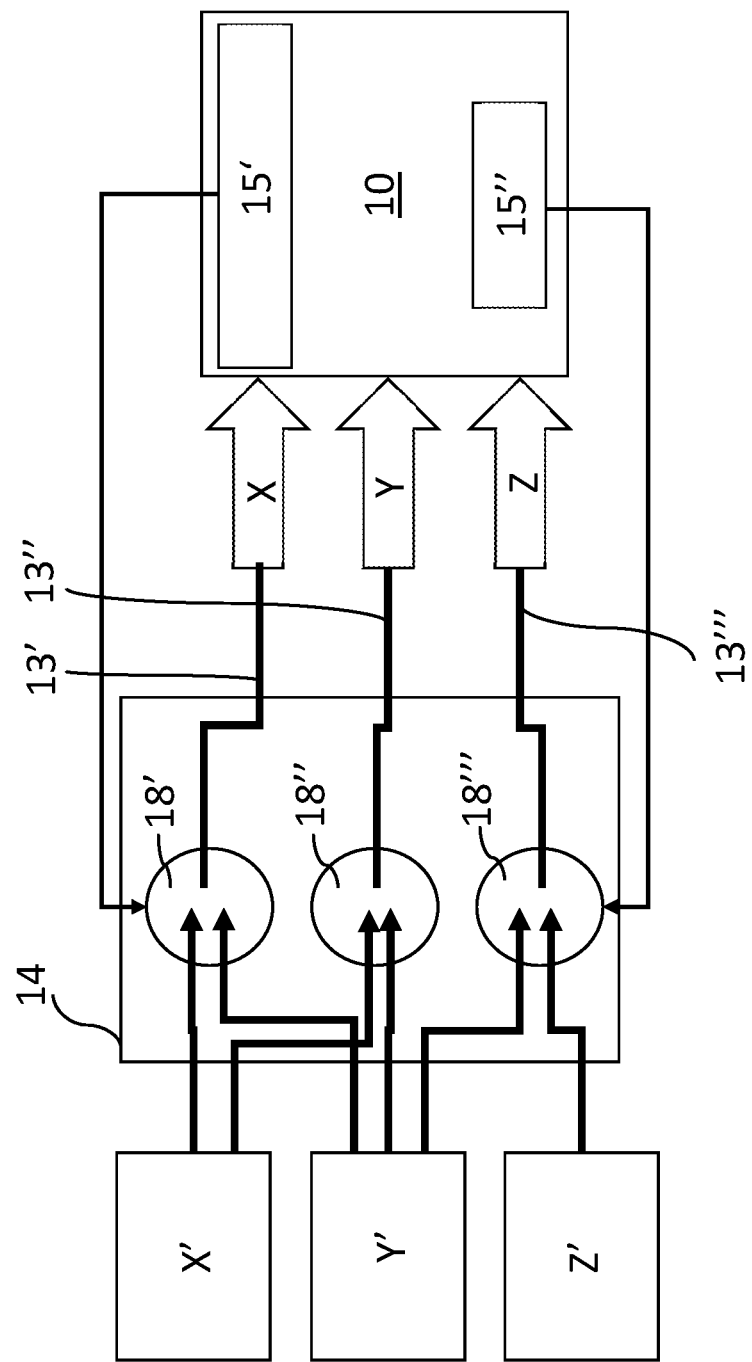
FIG. 3b is a schematic function diagram like FIG. 3a, but in an embodiment for preparing three gases.

FIGS. 3*a* and 3*b* schematically show how gas management according to the invention can appear:

The different gases or gas mixtures X; Y fed via the separate gas feeds 13'; 13" into the MAS stator 11 and the MAS rotor 12 are prepared from raw gases or raw gas mixtures X'; Y'; Z' introduced into a separate gas regulating unit 14, before they are conducted via the separate gas feeds 13'; 13" into the MAS stator 11 and the MAS rotor 12. The gas regulating unit 14 is designed to prepare the raw gases or raw gas mixtures X'; Y' as gaseous media X; Y having different compositions for the gas drive of the MAS rotor 12 and for the gas bearing of the MAS rotor 12 and to apply the corresponding respective adapted pressure thereto and to conduct them via the separate gas feeds 13'; 13" into the MAS stator 11, in order to effectuate the drive and the bearing of the MAS rotor 12 in the MAS turbine 10 separately from one another.

The use of such a gas regulating unit 14 is in particular advantageous in laboratories in which the pressurized gas supply is variable, because the gas regulating unit 14 is designed to feed the gas flows with optimized pressures into the MAS system.

A further gas or gas mixture Z can be conducted as a temperature control gas for a temperature control of the MAS rotor 12 through an additional gas feed 13''', which is spatially separate from the gas feed 13' for the bearing of the MAS rotor 12 and from the gas feed 13'' for the drive of the MAS rotor 12, into the MAS stator 11 and can also be separately regulated. The VT gas is typically a cost-effective inert gas such as $N_2$, which prevents electrical flashovers.

The gas regulating unit 14 is connected to a frequency sensor 15' on the MAS turbine 10 for setting the pressure and/or the composition of the drive and bearing gases X; Y and to a temperature sensor 15'' for measuring the temperature of the temperature control gas.

In FIG. 3a, two different gases, which are pressurized, are fed into a P/T regulating unit 14. In accordance with the requirements of the MAS system, the pressure is possibly regulated down and emitted into the MAS turbine 10. The preparation of the gases in the regulating unit 14 is necessary in particular with respect to the rotational speed of the MAS rotor 12. Bearing gas and drive gas can be regulated at different pressures. In particular, it is possible to prepare gas mixtures containing the gases X and Y in their composition for the bearing and the drive via the regulating unit 14. The rotational speed of the MAS rotor 12 can preferably be measured by means of a frequency sensor 15'' in the MAS turbine 10 and passed on as an in-line control to the regulating unit 14, in order to adapt the respective pressure or optimize the respective gas mixture in the composition.

Finally, FIG. 3b shows an embodiment in which up to three gases can be combined and the temperature control gas Z can also be prepared for the mixture. The third gas Z can be beneficial if a high dielectric strength is required. Then, for example, SF6 can be added as the gas Z, which has good electrical insulation. The gas regulating unit 14 contains a separate sub-regulating unit 18', 18''; 18''' in each case for separate regulation of the drive, bearing and temperature control gases X; Y; Z.

LIST OF REFERENCE SIGNS

10 MAS turbine
11 MAS stator
12 MAS rotor
13'; 13'' spatially separate physical gas feeds for the bearing and for the drive of the MAS rotor
13''' additional gas feed for the feed of a temperature control gas
14 gas regulating unit
15' frequency sensor
15'' temperature sensor
16 flushing seal
17' bearing nozzles
17'' drive nozzles
18'; 18''; 18''' sub-regulating units
X gas or gas mixture for the drive of the MAS rotor
Y gas or gas mixture for the bearing of the MAS rotor
Z gas or gas mixture for the temperature control of the MAS rotor
X'; Y'; Z' fed raw gas mixtures

The invention claimed is:

1. A method for operating a nuclear magnetic resonance (NMR) apparatus having a magic angle spinning (MAS) system with an MAS turbine (10) comprising an MAS stator (11) for receiving an oblong MAS rotor (12), wherein separate gas feeds (13'; 13'') for bearing and for driving of the MAS rotor (12) are arranged in the MAS stator (11), wherein a gas or gas mixture (X; Y) is fed to the MAS stator (11) through the separate gas feeds (13'; 13''), wherein a gas or gas mixture (X) is fed to the MAS stator (11) for the drive of the MAS rotor (12) through a first gas feed (13') and is fed through a second gas feed (13'') for the bearing of the MAS rotor (12), and wherein a pressurization of the gas or gas mixture (X; Y) is regulated separately in each case before being fed into the MAS stator (11), characterized in that at least two different gases or gas mixtures (X; Y) are fed to the MAS stator (11) through the separate gas feeds (13'; 13''), wherein one of the at least two different gases or gas mixtures (X) is fed to the MAS stator (11) for the drive of the MAS rotor (12) through a first gas feed (13'), another gas or gas mixture (Y), which is different therefrom, for the bearing of the MAS rotor (12) is fed through a second gas feed (13'');

that a pressurization of the at least two different gases or gas mixtures (X; Y) is regulated separately in each case before they are fed into the MAS stator (11); and that the different gases or gas mixtures (X; Y) are prevented from mixing in the MAS stator (11) by means of a flushing seal (16) arranged in the MAS stator (11), through which the different gases or gas mixtures (X; Y) for the drive of the MAS rotor (12) and for the bearing of the MAS rotor (12) at least partially flow out of the MAS stator (11).

2. The method according to claim 1, characterized in that the different gases or gas mixtures (X; Y) fed via the separate gas feeds (13'; 13'') into the MAS stator (11) and the MAS rotor (12) are prepared from raw gases or raw gas mixtures (X'; Y') introduced into a separate gas regulating unit (14), before they are conducted via the separate gas feeds (13'; 13'') into the MAS stator (11) and the MAS rotor (12).

3. The method according to claim 1, characterized in that the pressure of the gas or gas mixture (Y) for the bearing of the MAS rotor (12) is regulated to a value between 0.5 and 5 bar and the pressure of the gas or gas mixture (X) for the drive of the MAS rotor (12) is regulated to a value between 0 and 10 bar.

4. The method according to claim 1, characterized in that $N_2$ is present in the gas mixture (Y) for the bearing of the MAS rotor (12) and helium is present in the gas mixture (X) for the drive of the MAS rotor (12), and in particular that dry nitrogen is used as the gas (Y) for the bearing of the MAS rotor (12).

5. The method according to claim 1, characterized in that a $N_2$—He mixture having a He proportion between 0 and 50%, in particular between 0 and 30%, is used as the gas mixture (Y) for the bearing of the MAS rotor (12).

6. The method according to claim 1, characterized in that between 10% and 100%, in particular between 25% and 100%, preferably between 50% and 100% helium is used as the gas or gas mixture (X) for the drive of the MAS rotor (12).

7. The method according to claim 6, characterized in that the helium used has a degree of purity of at least 95%.

8. The method according to claim 1, characterized in that, as the temperature control gas for a temperature control of the MAS rotor (12), a further gas or gas mixture (Z) is conducted through an additional gas feed (13'''), which is spatially separate from the gas feed (13') for the bearing of the MAS rotor (12) and from the gas feed (13") for the drive of the MAS rotor (12), into the MAS stator (11) and is also separately regulated.

9. The method according to claim 8, characterized in that dry nitrogen, C5-perfluorinated ketone (C5-PFK), or dried and purified air is used as the gas or gas mixture (Z) for the temperature control of the MAS rotor (12).

10. A nuclear magnetic resonance (NMR) apparatus having a magic angle spinning (MAS) system with an MAS turbine (10) comprising:

- an MAS stator (11) for receiving an oblong MAS rotor (12);
- separate gas feeds (13'; 13") for bearing and for driving of the MAS rotor (12) arranged in the MAS stator (11); and
- a gas regulating unit (14) that can be supplied with fed raw gases or raw gas mixtures (X'; Y') via separate gas feed lines, and wherein the gas regulating unit (14) is designed to prepare the raw gas or raw gas mixture (X'; Y') for the gas drive of the MAS rotor (12) and for the gas bearing of the MAS rotor (12) and to apply the corresponding respective adapted pressure thereto and to conduct it via separate gas feeds (13'; 13") into the MAS stator (11) in order to effectuate the drive and the bearing of the MAS rotor (12) in the MAS turbine (10) separately from one another, characterized in

- that the gas regulating unit (14) can be supplied with at least two different fed raw gases or raw gas mixtures (X'; Y') via separate gas feed lines;
- that the gas regulating unit (14) is designed to prepare the raw gases or raw gas mixtures (X'; Y') as gaseous media (X; Y), which have different compositions, for the gas drive of the MAS rotor (12) and for the gas bearing of the MAS rotor (12) and to apply the corresponding respective adapted pressure thereto and to conduct them via separate gas feeds (13'; 13") into the MAS stator (11) in order to effectuate the drive and the bearing of the MAS rotor (12) in the MAS turbine (10) separately from one another; and
- that the MAS turbine (10) comprises a flushing seal (16), which is arranged between drive nozzles (17") and bearing nozzles (17') as an outflow device for the drive and bearing gases (X; Y) and is designed so that at least a part of the bearing gas (Y) is conducted through to prevent the drive gas (X) from reaching the region of an NMR coil.

11. The NMR apparatus according to claim 10, characterized in that the gas regulating unit (14) is connected to a frequency sensor (15') on the MAS turbine (10) for setting the pressure and/or the composition of the drive and bearing gases (X; Y).

12. The NMR apparatus according to claim 10, characterized in that the MAS stator (11) has a spatially separate additional gas feed (13''') for the feed of a further gas or gas mixture (Z) as a temperature control gas for a temperature control of the MAS rotor (12).

13. The NMR apparatus according to claim 12, characterized in that the gas regulating unit (14) contains a separate sub-regulating unit (18'; 18"; 18''') in each case for the separate regulation of the drive, bearing and temperature control gases (X; Y; Z).

\* \* \* \* \*